United States Patent
Reynolds

(10) Patent No.: US 8,907,921 B2
(45) Date of Patent: Dec. 9, 2014

(54) INTERFERENCE SENSING WITHIN A DISPLAY DEVICE WITH AN INTEGRATED SENSING DEVICE

(75) Inventor: Joseph Kurth Reynolds, Alviso, CA (US)

(73) Assignee: Synaptics Incorporated, San Jose, CA (US)

( * ) Notice: Subject to any disclaimer, the term of this patent is extended or adjusted under 35 U.S.C. 154(b) by 132 days.

(21) Appl. No.: 13/598,436

(22) Filed: Aug. 29, 2012

(65) Prior Publication Data

US 2013/0050144 A1    Feb. 28, 2013

Related U.S. Application Data

(60) Provisional application No. 61/529,048, filed on Aug. 30, 2011.

(51) Int. Cl.
| | | |
|---|---|---|
| *G06F 3/045* | (2006.01) | |
| *G06F 3/041* | (2006.01) | |
| *G06F 3/044* | (2006.01) | |

(52) U.S. Cl.
CPC ............ *G06F 3/0416* (2013.01); *G06F 3/044* (2013.01)
USPC ........................................................ 345/174

(58) Field of Classification Search
CPC ...... G06F 3/044; G06F 3/0416; G06F 3/0412
USPC ................... 345/173–174; 178/18.01
See application file for complete search history.

(56) References Cited

U.S. PATENT DOCUMENTS

| | | |
|---|---|---|
| 5,410,329 A | 4/1995 | Tagawa et al. |
| 5,534,892 A | 7/1996 | Tagawa |
| 6,239,788 B1 | 5/2001 | Nohno et al. |
| 2004/0217945 A1 | 11/2004 | Miyamoto et al. |
| 2005/0243068 A1 | 11/2005 | Johnson et al. |
| 2006/0146038 A1 | 7/2006 | Park et al. |
| 2008/0062148 A1 | 3/2008 | Hotelling et al. |
| 2008/0309627 A1* | 12/2008 | Hotelling et al. ............. 345/173 |
| 2010/0001973 A1 | 1/2010 | Hotelling et al. |
| 2010/0085324 A1 | 4/2010 | Noguchi et al. |
| 2010/0110040 A1 | 5/2010 | Kim et al. |
| 2010/0182273 A1 | 7/2010 | Noguchi et al. |
| 2010/0253638 A1 | 10/2010 | Yousefpor et al. |
| 2010/0301879 A1* | 12/2010 | Philipp ........................ 324/679 |
| 2011/0025634 A1* | 2/2011 | Krah et al. ..................... 345/173 |
| 2011/0063993 A1* | 3/2011 | Wilson et al. ................. 370/254 |
| 2012/0139846 A1 | 6/2012 | Krah et al. |

\* cited by examiner

*Primary Examiner* — Alexander Eisen
*Assistant Examiner* — Abhishek Sarma
(74) *Attorney, Agent, or Firm* — Patterson & Sheridan, LLP

(57) ABSTRACT

Embodiments of the present invention generally provide a method and system for sensing interference in a display device having integrated input sensing. In various embodiments of the invention, input sensing performed on one or more rows of common electrodes may be operated for interference sensing, and, during the blanking period, some or all of the common electrodes may be operated for interference sensing. Interference measurements acquired during blanking periods may be used to increase the accuracy with which input sensing is performed, for example, by establishing one or more baseline interference values and/or determining that one or more common electrodes should be driven at a different frequency. In some embodiments, all of the common electrodes may be operated for interference sensing during a blanking period, while in other embodiments a portion of the common electrodes (e.g., one-third, one-half, etc.) may be operated for interference sensing during a blanking period.

21 Claims, 7 Drawing Sheets

INTERFERENCE SENSING WITHIN A DISPLAY DEVICE WITH AN INTEGRATED SENSING DEVICE

CROSS-REFERENCE TO RELATED APPLICATIONS

This application claims benefit of U.S. Provisional Patent Application Ser. No. 61/529,048, filed Aug. 30, 2011, which is herein incorporated by reference in its entirety.

BACKGROUND OF THE INVENTION

1. Field of the Invention

Embodiments of the present invention generally relate to a method, device, and system for sensing interference in a display device having integrated input sensing.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as opaque touchpads integrated in or peripheral to notebook or desktop computers. Proximity sensor devices also are often used in smaller computing systems, such as touch screens integrated in cellular phones.

Proximity sensor devices are typically used in combination with other supporting components, such as display or input devices found in the electronic or computing system. In some configurations, the proximity sensor devices are coupled to, or placed in close proximity to, these supporting components to provide a desired combined function or to provide a desirable complete device package. Many commercially available proximity sensor devices utilize one or more electrical techniques to determine the presence, location and/or motion of an input object, such as a capacitive or a resistive sensing technique. However, these useful electrical sensing techniques are susceptible to interference, such as electromagnetic interference (EMI), commonly generated by the other supporting components, such as liquid crystal display (LCD) components, that are positioned near the proximity sensor device. In touch screen-type applications, since it is often desirable to have the proximity sensor information processed at a rate higher than the display refresh rate in order to better track the movement or position of an input object, EMI seen by components in the proximity sensing device may vary at any instant in time, depending on where the display device is in its refresh cycle.

Current systems have been unable to effectively measure this type of EMI, since interference measurements cannot effectively be performed during proximity sensing, and image-dependent noise associated with display updating prevents accurate interference measurements from being obtained during display-update times. Instead, current systems have commonly resorted to minimizing the magnitude of EMI by distancing EMI-generating components from proximity sensing components, adding shielding components to the device package, and/or altering the display processing method, making the resulting system more expensive and/or needlessly increasing its size and/or weight.

Therefore, there is a need for an improved method, device, and system for sensing interference in a display device having integrated input sensing.

SUMMARY OF THE INVENTION

Embodiments of the present invention generally provide a method, device, and system for sensing interference in a display device having integrated input sensing. In various embodiments of the invention, some or all of the common electrodes may be operated for interference sensing during a portion of a display frame. In some embodiments, all of the common electrodes are operated for interference sensing during a portion of a display frame. In other embodiments, a portion of the common electrodes (e.g., one-third, one-half, etc.) are operated for interference sensing during a portion of a display frame. Interference measurements acquired during one or more portion of a display frames may be used to increase the accuracy with which positional information of an input object may be determined.

Embodiments of the present invention also may generally provide a processing system for a display device with an integrated capacitive sensing device. The processing system includes a driver module configured to be communicatively coupled to a plurality of common electrodes configured for capacitive sensing and display updating. The plurality of common electrodes includes a first set of common electrodes and a second set of common electrodes. The first set of the common electrodes includes at least one common electrode included in the second set of the common electrodes and at least one common electrode not included in the second set of the common electrodes. The driver module is configured for driving the plurality of common electrodes for display updating during a first display frame, driving the first set of common electrodes for capacitive sensing during a first portion of the first display frame, and operating the plurality of common electrodes in a substantially non-modulating manner for interference sensing during a second portion of the first display frame. The processing system further includes a receiver module configured to be communicatively coupled to the plurality of receiver electrodes. The receiver module is further configured for receiving first resulting signals during the first portion of the first display frame, and receiving second resulting signals during the second portion of the first display frame. The processing system further includes a determination module configured for determining at least portion of a first capacitive frame based on the first resulting signals and an interference measurement corresponding to the first capacitive frame based on the second resulting signals.

Embodiments of the present invention may further provide a display device with an integrated capacitive sensing device. The display device includes a plurality of common electrodes configured for capacitive sensing and display updating. The plurality of common electrodes includes a first set of common electrodes and a second set of common electrodes. The first set of the common electrodes includes at least one common electrode included in the second set of the common electrodes and at least one common electrode not included in the second set of the common electrodes. The display device further includes a driver module configured to be communicatively coupled to the plurality of common electrodes. The driver module is further configured to drive the plurality of common electrodes for display updating during a first display frame and during a second display frame, drive the first set of common electrodes for capacitive sensing during a first portion of the first display frame, operate the plurality of common electrodes in a substantially non-modulating manner for interference sensing during a second portion of the first display frame, drive the second set of common electrodes for capacitive sensing during a first portion of the second display frame, and operate the plurality of common electrodes in a substantially non-modulating manner for interference sensing during a second portion of the second display frame. The display device further includes a plurality of receiver electrodes and a receiver module configured to be communicatively coupled to the plurality of receiver electrodes. The receiver module is further configured to receive first resulting signals during the first portion of the first display frame, second resulting signals during the second portion of the first display frame, third resulting signals during the first portion of the second display frame, and fourth resulting signals during the second portion of the second display frame with the plurality of receiver electrodes. The display device further includes a determination module configured to determine at least portion of a first capacitive frame based on the first resulting signals and an interference measurement corresponding to the first capacitive frame based on the second resulting signals.

Embodiments of the present invention may further provide a method of capacitive sensing in a display device having a plurality of common electrodes configured for capacitive sensing and display updating, the plurality of common electrodes including a first set of common electrodes and a second set of common electrodes, the first set of the common electrodes including at least one common electrode included in the second set of the common electrodes and at least one common electrode not included in the second set of the common electrodes. The method includes driving the plurality of common electrodes for display updating during a first display frame and during a second display frame, driving the first set of common electrodes for capacitive sensing during a first portion of the first display frame, operating the plurality of common electrodes in a substantially non-modulating manner for interference sensing during a second portion of the first display frame, driving the second set of common electrodes for capacitive sensing during a first portion of the second display frame, operating the plurality of common electrodes in a substantially non-modulating manner for interference sensing during a second portion of the second display frame, receiving first resulting signals during the first portion of the first display frame, receiving second resulting signals during the second portion of the first display frame, receiving third resulting signals during the first portion of the second display frame, receiving fourth resulting signals during the second portion of the second display frame, and determining at least portion of a first capacitive frame based on the first resulting signals and an interference measurement corresponding to the first capacitive frame based on the second resulting signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the present invention generally provide a method and system in which one or more common electrodes may be operated for interference sensing, that is, instead of driving the one or more rows of common electrodes for input sensing during a non-display update time period(s), the non-display update time period(s) may be used to operate some or all of the common electrodes for interference sensing. Interference measurements acquired may be used to increase the accuracy with which positional information of an input object is measured. For example, the interference measurements may be used to establish one or more baseline interference values, determine that one or more common electrodes should be driven at a different frequency, and/or determine that an acquired capacitive image is too noisy and should be discarded. In one embodiment of the invention, during a portion of a display frame, all of the common electrodes may be operated for interference sensing. In another embodiment of the invention, during a portion of a display frame, a portion of the common electrodes (e.g., one-third, one-half, etc.) may be operated for interference sensing.

Figure 1:
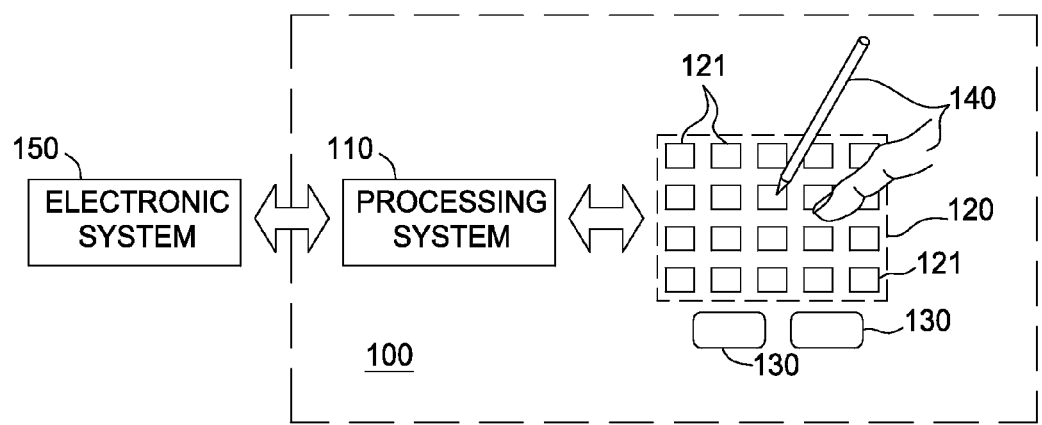
FIG. 1 is a schematic block diagram of an input device in accordance with embodiments of the invention.

In FIG. 1, input device 100 is illustrated. In various embodiments input device 100 comprises a display device having an integrated sensing device. The combination of the display device and the sensing device may be referred to as a "touch screen." The input device 100 is shown as a proximity sensor device (also often referred to as a "touchpad" a "touch sensor device" or a "touch screen") configured to sense input provided by one or more input objects 140 in a sensing region 120. Example input objects include fingers and styli, as shown in FIG. 1. In various embodiments input device 100 comprises a display device having an integrated sensing device. In various embodiments, the combination of the display device and the sensing device is referred to as a "touch screen."

Sensing region 120 encompasses any space above, around, in, and/or near the input device 100 in which the input device 100 is able to detect user input. The sizes, shapes, and locations of particular sensing regions may vary widely from embodiment to embodiment. In some embodiments, the sensing region 120 extends from a surface of the input device 100 in one or more directions into space until signal-to-noise ratios prevent the accurate detection of an input object. In various embodiments, the distance to which this sensing region 120 extends in a particular direction is on the order of less than a millimeter, millimeters, centimeters, or more, and may vary significantly with the type of sensing technology used and the accuracy desired. Thus, some embodiments sense input that includes no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces are provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 includes one or more sensing elements for detecting user input. Some implementations are configured to provide sensing images that span one, two, three, or higher dimensional spaces.

In some applications, the sensing elements in the input device 100 are positioned in close proximity to components internal or external to the input device 100 which provide undesirable interference, such as electromagnetic interference (EMI), and affect the data acquired from the sensing elements. Consequently, EMI generated by the internal or external components may affect the acquired sensing image, which may lead to false detection of the presence or absence of the input object 140, create inaccuracies in the positional information determined from the sensing images, and/or result in an apparent "bouncing" of an input object between multiple locations in the sensing region 120.

System Overview

FIG. 1 is a schematic block diagram of input device 100 in accordance with embodiments of the invention. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system 150 could be a host or a slave to the input device 100.

In some embodiments, the input device 100 includes a touch screen interface, and the sensing region 120 overlaps at least part of an active area of a display screen. For example, the input device 100 may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments utilize some of the same electrical components for displaying and sensing. As another example, the display screen may be operated partially or entirely by the processing system 110.

The input device 100 can be implemented as a physical part of the electronic system 150 or can be physically separate from the electronic system 150. As appropriate, the input device 100 may communicate with parts of the electronic system 150 using any one or more of the following: buses, networks, and other wired or wireless interconnections. Examples include Inter-Integrated Circuit ($I^2C$), Serial Peripheral Interface (SPI), PS/2, Universal Serial Bus (USB), Bluetooth, radio frequency (RF), and Infrared Data Association (IrDA).

In FIG. 1, a processing system 110 is shown as part of the input device 100. The processing system 110 also may be configured to operate the display device 160. The processing system 110 includes part or all of one or more integrated circuits (ICs) and/or other circuitry components. For example, a processing system for a mutual capacitance sensor device may include transmitter circuitry configured to transmit signals with transmitter sensor electrodes and/or receiver circuitry configured to receive signals with receiver sensor electrodes. In some embodiments, the processing system 110 also includes electronically-readable instructions, such as firmware code, software code, and the like.

In some embodiments, components of the processing system 110 are located together, such as near sensing element(s) of the input device 100. In other embodiments, components of the processing system 110 are physically separate from one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may include circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may include circuitry that is a part of the processing system 110, firmware, software, or a combination thereof. In various embodiments, different combinations of modules may be used. Example modules include hardware operation modules for operating hardware such as sensor electrodes and display screens, data processing modules for processing data, such as sensor signals and positional information, and reporting modules for reporting information. Further example modules include sensor operation modules configured to operate sensing element(s) to detect input, identification modules configured to identify gestures, such as mode changing gestures, and mode changing modules for changing operation modes.

In some embodiments, the processing system 110 directly responds to user input (or lack of user input) in the sensing region 120 by performing one or more actions. Example actions include changing operation modes, as well as GUI actions such as cursor movement, selection, menu navigation, and other functions. In some embodiments, the processing system 110 provides information about the input (or lack of input) to some part of the electronic system, such as to a central processing system of the electronic system that is separate from the processing system 110, if such a separate central processing system exists. In some embodiments, some part of the electronic system processes information received from the processing system 110 to act on user input, such as to facilitate a full range of actions including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog, electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 is implemented with no other input components.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Sensing Device Overview

In various embodiments, positional information of the input object 140 relative to the sensing region 120 is monitored or sensed by use of one or more sensing elements that are positioned to detect its "positional information." In general, the sensing elements may include one or more sensor elements that are used to detect the presence (or positional information) of an input object. As discussed above, the one or more sensing elements of the input device 100 may use capacitive, elastive, resistive, inductive, magnetic, acoustic, ultrasonic, and/or optical techniques to sense the position of an input object. While the information presented below primarily discuses the operation of an input device 100 which uses capacitive sensing techniques to monitor or determine the position of an input object 140, this configuration is not intended to be limiting as to the scope of the invention described herein, since other sensing techniques may be used.

In some capacitive implementations of the input device 100, voltage or current is applied to create an electric field. Nearby input objects cause changes in the electric field and produce detectable changes in capacitive coupling that may be detected as changes in voltage, current, or the like. Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals and/or to one or more sources of environmental interference (e.g., other electromagnetic signals). Sensor electrodes may be dedicated transmitters or receivers, or may be configured to both transmit and receive.

Figure 2:
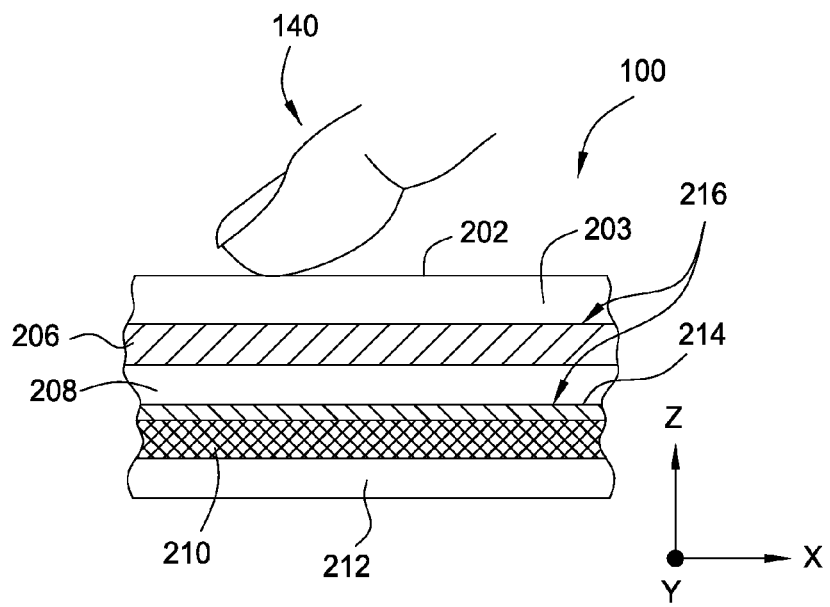
FIG. 2 is a partial schematic cross-sectional view of an embodiment of the input device of FIG. 1.

FIG. 2 is a partial schematic cross-sectional view of an embodiment of input device 100 of FIG. 1. In such an embodiment, the input device comprises a display device with an integrated sensor device, and includes an input surface 202 provided by a first substrate 203 disposed between the input object 140 and the sensing elements of the sensor assembly. The first substrate 203 may include a lens or window comprising a glass, plastic or any other substantially transparent material. The sensor electrodes 216 include a first plurality of sensor electrodes 214 and a second plurality of sensor electrodes 206 for sensing input object 140. In one embodiment, the first plurality of sensor electrodes 214 are configured as transmitter electrodes while the second plurality of sensor electrodes 206 are configured as receiver electrodes. A second substrate 208 may include a color filter glass. The input device may include a display element layer 210 and a third substrate 212. In one embodiment the third substrate is an active layer comprising the switching and driving circuitry of the display device. For example, the third substrate may be a thin-film transistor (TFT) layer or the like. In various embodiments, the display element layer 210 may include a layer containing field-effect display materials, such as liquid crystal (LC), organic light emitting diodes (OLED), or other display materials.

In one embodiment the second plurality of sensor electrodes 206 may be disposed such that they are between the first plurality of sensor electrodes 214 and input surface 202. In various embodiments, the second plurality of sensor electrodes 206 may be disposed on input surface 202 or second substrate 208. In other embodiments, the second plurality of sensor electrodes may be disposed on a substrate between the input surface 202 and second substrate 208, such as a polarizer film (not shown), an anti-shatter film and the like. The first plurality of sensor electrodes 214 may be used both for sensing positional information of the input object 140 and for updating the display device. In various embodiments the second plurality of sensor electrodes may be disposed on third substrate 212 or second substrate 208 such that they are insulated from the second plurality of sensor electrodes 206. While not shown, in yet another embodiment, the first plurality of sensor electrodes 214 and the second plurality of sensor electrodes 206 are disposed such that they are on the same layer of a substrate. For example, the first plurality of sensor electrodes 214 and the second plurality of sensor electrodes 206 may be disposed on a first side of second substrate 208 or on a first side of third substrate 212. In further embodiments, the input device may include additional layers not shown, and at least a portion of the first plurality of sensor electrodes 214 and/or the second plurality of sensor electrodes 206 may be disposed on one of the additional layers.

Figure 3:
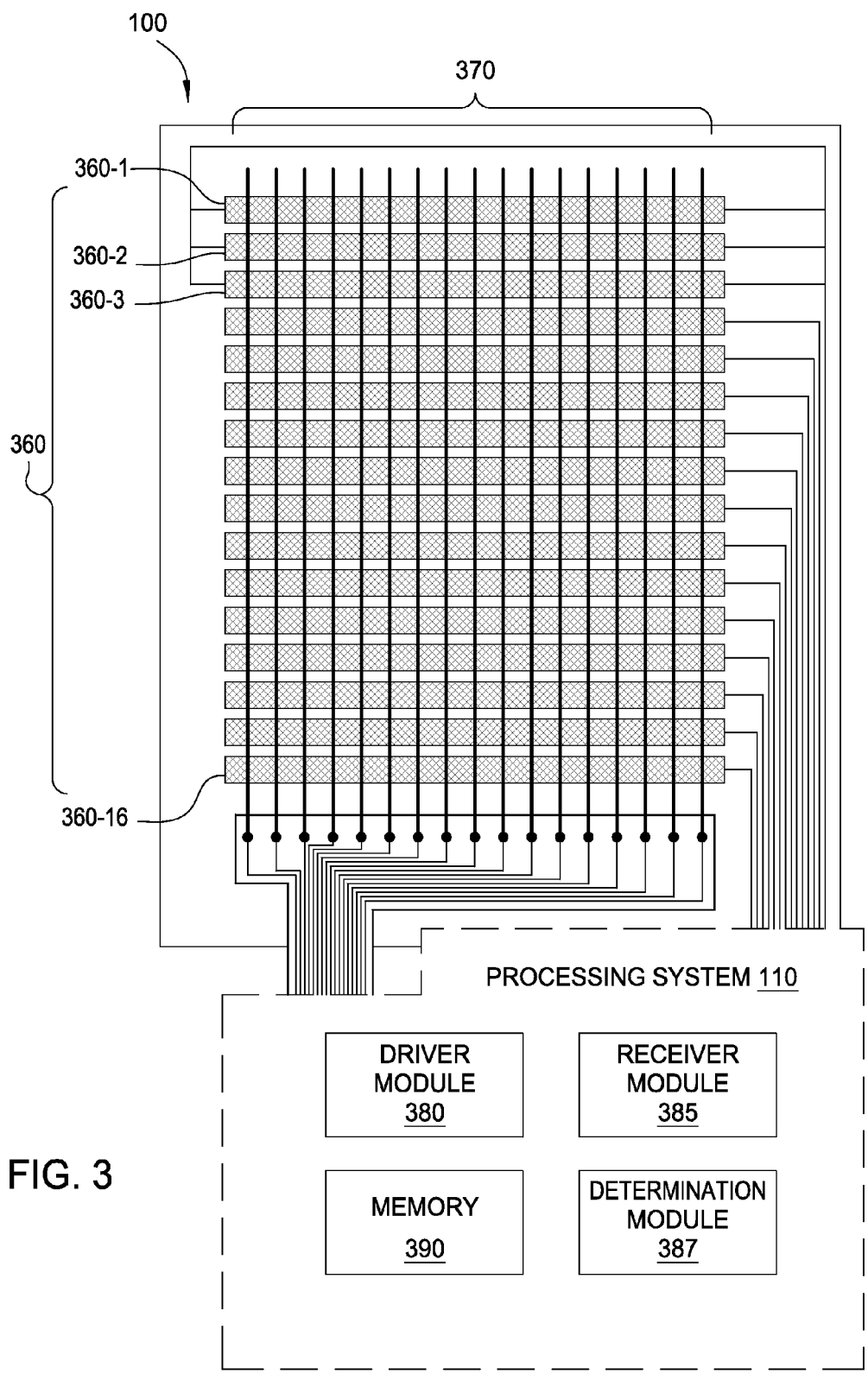
FIG. 3 is a partial schematic plan view of an embodiment of the input device of FIG. 1.

FIG. 3 is a partial schematic plan view of an embodiment of the input device 100 of FIG. 1. The input device 100 includes a plurality of sensor electrodes and a processing system 110. In one embodiment, processing system 110 comprises a single integrated circuit. In other embodiments, processing system 110 comprises at least two separate integrated circuits and a synchronization mechanism configured to synchronize the multiple processing systems with each other. The plurality of sensor electrodes include a plurality of transmitter electrodes 360 (e.g., transmitter electrodes 360-1, 360-2, 360-3, etc.) and a plurality of receiver electrodes 370 (e.g., receiver electrodes 370-1, 370-2, 370-3, etc.). In various embodiments, a transmitter electrode may comprise one or more common electrodes. Further, in the following description, common electrodes or sets of common electrodes may be used interchangeably with transmitter electrodes. Processing system 110 may comprise a driver module 380, a receiver module 385, a determination module 387, and an optional memory 390. In those embodiments where processing system 110 comprises multiple integrated circuits, the drive module 380, receiver module 385 and/or the determination module 387 may reside entirely within one of the multiple processing systems or within more than one of the processing systems. Further, transmitter electrodes 360 and receiver electrodes 370 may be coupled with one of the multiple processing systems or with more than one of the processing systems. In one embodiment, the transmitter electrodes 360 (and corresponding common electrodes) may be directly driven or indirectly driven through selection transistors (e.g., TFT). In various embodiments, the transmitter electrode may be selected by driver module 380.

The processing system 110 is coupled with receiver electrodes 370 and configured to receive resulting signals with receiver electrodes 370 and with common electrodes which may be configured to perform as transmitter electrodes 360. Driver module 380 may be configured for updating images on the display screen of the display device. For example, the driver module 380 may be configured to apply one or more pixel voltage(s) to the display pixel electrodes through pixel source drivers (not shown). In one embodiment, the common electrodes may comprise the pixel source electrodes of the display screen. The driver module 380 also may be configured to apply one or more common drive voltage(s) to the common electrodes through the driver module 380 to operate the common electrodes to update the display screen. In some embodiments (e.g., line inversion embodiments), the driver module 380 is also configured to invert the common drive voltage in synchronization with a drive cycle of the image display. The processing system 110-2 may also be configured to operate common electrodes as transmitter electrodes 360 for capacitive sensing, such as by driving the common electrodes with the driver module 380.

As mentioned above, processing system 110 illustrated in FIG. 3 may comprise a single integrated circuit or multiple integrated circuits to control the various components in the input device. For example, the functions of the processing system 110 may be implemented in one integrated circuit that can control the display device elements and drive transmitter signals and/or receive resulting signals transmitted with and/or received from the sensor electrodes, which may include the receiver electrodes 370 and transmitter electrodes 360. In cases where there are more than one integrated circuit, communicating between separate integrated circuits may be achieved by using a synchronization mechanism.

In some touch screen embodiments, the transmitter electrodes 360 and/or the receiver electrodes 370 are disposed on a substrate of the associated display screen. For example, the transmitter electrodes 360 and/or the receiver electrodes 370 may be disposed on a polarizer, a color filter substrate (reference numeral 208 in FIG. 2), or a lens or window of a display device. As a specific example, the transmitter electrodes 360 may be disposed on an active layer substrate (reference numeral 212 in FIG. 2) of a display device and may be used in display operations of the display screen. As another example, the receiver electrodes 370 may be disposed on a color filter substrate (reference numeral 208 in FIG. 2), on polarizer film, on a protective material (e.g., an anti-shatter, anti-static film or the like) disposed on the display device, on a lens or window (reference numeral 203 in FIG. 2), and the like.

Transmitter electrodes 360 and receiver electrodes 370 are ohmically isolated from each other. That is, one or more insulators separate transmitter electrodes 360 and receiver electrodes 370 and prevent them from electrically shorting to each other. In one embodiment, an electrically insulative material separates the transmitter electrodes 360 and the receiver electrodes 370 at cross-over areas at which the electrodes intersect. In such configurations, the transmitter electrodes 360 and/or receiver electrodes 370 may be formed with jumpers connecting different portions of the same electrode. In some embodiments, transmitter electrodes 360 and receiver electrodes 370 are separated by one or more layers of electrically insulative material and/or by one or more substrates. For example, the transmitter electrodes 360 and receiver electrodes 370 may be disposed on opposite sides of the same substrate (e.g., color filter glass), or the electrodes may be disposed on different substrates and/or layers of the sensor assembly 204. In yet other embodiments, the transmitter electrodes 360 and receiver electrodes 370 are disposed in a similar layer on the same side of a substrate and an insulative material is patterned between them or the sensor electrodes may be patterned such that they are isolated from each other.

The areas of localized capacitive coupling between transmitter electrodes 360 and receiver electrodes 370 may be termed "capacitive pixels." The capacitive coupling between the transmitter electrodes 360 and receiver electrodes 370 changes with the proximity and motion of input objects in the sensing region 120 associated with the transmitter electrodes 360 and receiver electrodes 370.

In some embodiments, the sensor pattern is "scanned" to determine these capacitive couplings. That is, the transmitter electrodes 360 are driven to transmit transmitter signals. The input device 100 may be operated such that one transmitter electrode transmits at one time, or multiple transmitter electrodes transmit at the same time. Where multiple transmitter electrodes transmit simultaneously, these multiple transmitter electrodes may transmit the same transmitter signal to effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 370 to be independently determined. The receiver sensor electrodes 370 may be operated singly or multiply to acquire resulting signals. The resulting signals may be used to determine measurements of the capacitive couplings at the capacitive pixels. Such measurements are then used to determine whether an input object is present and, if an input object is present, its positional information, as discussed above. In various embodiments, where each transmitter electrode comprises one or more common electrodes, driving common electrodes for capacitive sensing may comprise any of the above methods.

A set of measurements from the capacitive pixels form a "capacitive image" (also "capacitive frame") representative of the capacitive couplings at the pixels. Multiple capacitive images may be acquired over multiple time periods and differences between them used to derive information about input in the sensing region. For example, successive capacitive images acquired over successive periods of time can be used to track the motion(s) of one or more input objects entering, exiting, and within the sensing region (e.g., the area of the frame).

The baseline capacitance of a sensor device is the capacitive image associated with no input object in the sensing region. The baseline capacitance changes with the environment and operating conditions, and may be estimated in various ways. For example, some embodiments take "baseline images" when it is determined that there is no input object in the sensing region and use those baseline images as estimates of their baseline capacitances.

Capacitive images can be adjusted for the baseline capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels and determine changes from that baseline image. In various embodiments, "baselining" measurements depends upon the measured interference.

In various touch screen embodiments, the "capacitive frame rate" or "report rate" (the rate at which full successive capacitive images are acquired) may be the same or may be different than the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the baseline capacitive image. Thus, if a first capacitive image is acquired when the display updating is at a first state (e.g., beginning of updating a display frame), and a second capacitive image is acquired when the display updating is at a second state (e.g., a fraction of the way through updating a display frame), the first and second capacitive images may differ due to differences in the baseline capacitive image associated with the display updating states, and not due to changes in the sensing region. Further, the interference measurements may also be affected by different display updating states. This is more likely where the capacitive sensing and display updating electrodes are in close proximity to each other, or when they are shared (e.g., common electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a third display updating state (e.g., one half of the way through updating a display frame) is considered to be of a third frame type, and so on. Where the relationship of display update state and capacitive image acquisition is periodic, acquired capacitive images may repeatedly cycle through the frame types. Similarly, interference measurements of different types may be taken during different updating states.

In some touch screen embodiments, the transmitter electrodes 360 also are used in updating the display of the screen and also may be referred to as common electrodes (e.g., segments of a segmented V-com electrode or source driver electrodes). These common electrodes (e.g., reference numerals 360-1, 360-2, 360-3, . . . 360-16 shown in FIG. 3) may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode," since it performs multiple functions.

In various embodiments, the common electrodes transmit signals for display updating and capacitive sensing in the same time period, or in different time periods. In one embodiment, the common electrodes may transmit signals for display updating during a display-update time of a row update cycle and may transmit signals for capacitive sensing during a non-display update time (i.e., non-display update period) of the row update cycle (e.g. a "horizontal blanking time"). For example, the display-update time may include a first portion of a first display frame, and the non-display update time may include a second portion of the first display frame. As another example, the common electrodes may transmit signals for display updating during multiple row update cycles for display row updates, and transmit multiple cycles of signals for capacitive sensing during a period of time without actual display row updates (e.g., the non-display update times between updating multiple display lines, sections of frames or entire frames, sometimes called "vertical blanking time" or "long horizontal blanking periods."). In one embodiment, a long horizontal blanking period may be non-display update period that is as least as long as a display row update time. In another embodiment, a long horizontal blanking period (i.e., in-frame blanking period) may be non-display update period is longer than a display row update time. Further, a long horizontal blanking period may occur between display row update times of a display frame.

Further, in various embodiments, the common electrodes may transmit signals for capacitive sensing during any combination of the above non-display update times. As a further example, the common electrodes may transmit signals simultaneously for display updating and capacitive sensing, but separate them spatially. For instance, signals for display updating may be transmitted on a first set of one or more common electrodes while signals for capacitive sensing are simultaneously transmitted on a second, non-overlapping set of one or more common electrodes. As yet another example, the common electrodes may use the same transmission for both display updating and capacitive sensing.

In some touch screen embodiments, other components in addition to, or in place of, the common electrodes may be shared to perform both display updating and capacitive sensing. For example, one processing system may be used to perform both display updating and capacitive sensing functions.

In one embodiment, processing system 110 includes a driver module 380, a receiver module 385, a determination module 387, and an optional memory 390 (e.g., full or partial frame buffer memory, display overlay memory, etc.). The driver module 380 is operable to transmit transmitter signals with one or more transmitter electrodes (common electrodes) that are configured for capacitive sensing. For example, driver module 380 may be configured to drive transmitter electrodes to transmit transmitter signals, to hold the transmitter electrodes to a reference voltage (e.g., to a V-com voltage, to system ground, etc.), to electrically float the transmitter electrodes, to short multiple transmitter electrodes together for charge sharing, or to hold the transmitter electrodes at high impedance. The transmitter signals that are driven onto the transmitter electrodes may be driven with different frequencies, amplitudes, phases and/or codes. Receiver module 385 is configured to operate receiver electrodes to receive the resulting signals. In various embodiments, receiving the resulting signals may involve filtering the signals (e.g., associated with corresponding frequencies, amplitudes, phase and/or codes) such that a portion of the resulting signals may be received more strongly than other resulting signals. In some configurations, the receiver module 385 is adapted to acquire and/or receive resulting signals during a time period in which the transmitter electrodes are being operated in a substantially different (e.g., non-modulating) manner to sense and determine an amount of interference (e.g., internal interference, environmental interference, etc.). In some embodiments the operation of the receiver filtering during the interference measurement may be substantially similar to that during the input image sensing frame (e.g. frequency, phase, bandwidth, and the like), while in other embodiments it may be substantially different (e.g. in frequency, phase, bandwidth, and the like). Measuring interference by measuring while the transmitter electrodes are operated in the substantially different manner may comprise measuring the magnitude (e.g. amplitude, power, and the like) of signal over a period of sensing while the transmitter electrodes are substantially non-modulating. Alternately, measuring interference may comprise measuring a change in magnitude (e.g. amplitude, power, and the like) of signal over a period of sensing while the transmitter electrodes are modulated in a substantially different manner (e.g. different frequency, shifted phase, changed amplitude). In yet another embodiment, measuring interference may comprise measuring the magnitude (e.g. amplitude, power, and the like) of signal over a period of sensing while the transmitter electrodes are modulated, where the receiver filter substantially rejects the transmitter signal. Other heuristic methods of determining interference such as voting schemes for measuring the signal or comparison of subsequent input or interference frames may also be used. Optional memory 390 is configured to store one or more interference measurements, baseline images, sensing images, and/or other useful data acquired by the sensor electrodes.

The determination module 387 may be used to process sensor data (e.g., resulting signals) and determine one or more capacitive images related to positional information of an input object. In various embodiments, the determination module 387 determines positional information by comparing different types of sensing frames with measured interference, an appropriate differential image, and/or a baseline image to produce an interference free delta image.

During operation, receiver electrodes 370 are configured to receive resulting signals that may be used to form a capacitive image that may be used to determine the positional information of the input object 140 in the sensing region 120. As noted above, multiple capacitive images may be acquired over multiple time periods, and differences between them used to derive information about the input object. In one example, successive capacitive images that are acquired over successive periods of time can be used to track the motion(s) of one or more input objects entering, exiting, and within the sensing region 120.

As discussed above, in some applications, the sensor electrodes in the input device 100 are positioned in close proximity to components internal or external to the input device 100 that provide undesirable interference that affects the data acquired from the sensing elements. The interference, such as EMI generated by these internal or external components, may affect the acquired sensing image, or capacitive image as the case may be, which may lead to false detection of the presence of an input object 140 or a failure to detect an input object 140. In cases where the EMI is substantially non-random in nature, embodiments of the invention described herein can be used to measure interference and minimize its effect on sensor electrodes, as will be discussed further below.

One form of interference that can affect the resulting signals received with the sensor electrodes is electrical interference generated by the various electrical components found in a display module (e.g., LED, OLED, CRT, LCD, EL, or other types of displays) that is disposed in close proximity to the sensor electrodes. In various embodiments, display modules are configured to refresh the display region at a rate of between about 50 and about 250 Hertz (Hz), commonly referred to herein as the "display frame rate." In other embodiments, the display frame rate may be below 50 Hz and above 250 Hz, or the refresh rate may be reduced while the update period (e.g., 20 ms for 50 Hz to 4 ms for 250 Hz) for that display frame may be held constant. In various embodiments, the capacitive frame rate, or sensing image frame rate, may be greater than or less than the display frame rate. In various embodiments, the capacitive frame rate may be between 40 and 180 Hertz, however, in other embodiments the frame rate may be below 40 Hertz and above 180 Hertz. Further, in one embodiment, the capacitive frame rate is an integer multiple of the display frame rate. In other embodiments, the capacitive frame rate is a non-integer multiple (e.g., three halves, two thirds, or any other non-integer multiple) of the display frame rate. In yet further embodiments, the capacitive frame rate may be a non-constant rate. In various embodiments, a display frame may be substantially equal to a capacitive frame and an interference frame. In other embodiments, a display frame may be substantially equal to more than one capacitive frame and at least one interference frame. In yet other embodiments, a display frame may be substantially equal to a portion of a capacitive frame and an interference frame. In further embodiments, a display frame may be substantially equal to a portion of a first capacitive frame, a portion of a second capacitive frame and at least one interference frame. In yet further embodiments, the display frame may be substantially equal to any combination of portions of capacitive frames, full capacitive frames and interference frames. In various embodiments, due to the difference between the rate between capacitive frame rate and the display frame rate, the EMI seen by the sensing elements may have a periodic and/or a cyclic variation, which may be dependent on the display updating state.

As discussed above, the input device 100 may comprise a sensing device (e.g., a capacitive sensing device) integrated within a display device such that one or more common electrodes within the integrated device are configured to transmit both signals for display updating and signals for sensing positional information of an input object. In order to avoid image-dependent noise associated with display updating, the common electrodes may be driven for capacitive sensing during non-display update times. In many embodiments, since the common electrodes are also not being driven for display updating during non-display update times, these periods also are useful for interference sensing.

In various embodiments of the present invention, in order to sense interference, one or more rows of common electrodes may be operated for interference sensing, that is, instead of driving the one or more rows of common electrodes for input sensing during the entire non-display update time period, at least a portion of the non-display update time period is used to operate some or all of the common electrodes for interference sensing while not input sensing. In one example, instead of driving the one or more rows of common electrodes for input sensing during a non-display update time period, all of the common electrodes are operated for interference sensing.

FIGS. 4A-4D illustrate schematic plan views of an embodiment of input device 100 comprising a display device having an integrated sensing device during several display update periods 410-1, 410-2, 410-3, and 410-4 (collectively "410") according to one embodiment of the invention. The common electrodes are grouped into sets, wherein the individual common electrodes may be included in one or more sets. The sets of common electrodes may be operated differently depending on a specific portion in time (sub-period) of a non-display update period (i.e., non-display update time). In various embodiments, a set of common electrodes may correspond to one or more transmitter electrodes. The portions of the display from comprise interference sensing sub-periods and input sensing sub-periods. During an interference sensing sub-period, all or at least a portion of the common electrodes may be operated for interference sensing during non-display update periods corresponding to a first set of common electrodes. During an input sensing sub-period a set of common electrodes may be driven for capacitive sensing during corresponding non-display update periods. The set of common electrodes comprises at least a portion of the common electrodes or all of the common electrodes. In one embodiment, at least on common electrode may be driven more than one time for capacitive sensing.

When driven for capacitive sensing, the common electrodes may be operated one electrode at a time, or all electrodes in a set (or multiple sets) of common electrodes may be operated simultaneously. Each common electrode may be part of more than one common electrode set. Each display update period 410-1, 410-2, 410-3, 410-4 (collectively "410") may include one or more interference sensing sub-period(s) 425-1, 425-2, 425-3 etc. (collectively "425") and one or more input sensing sub-period(s) 435-1, 435-2, 435-3 etc. (collectively "435"). Although the display update periods 410 illustrated in FIGS. 4A-4D utilize interference sensing sub-periods 425 that are approximately one quarter of a display update period 410, each interference sensing sub-period 425 may be any fraction of a display update period 410. In one embodiment, the set of the common electrodes 430-1 includes at least one common electrode included in the set of the common electrodes 430-3 and at least one common electrode not included in the set of the common electrodes 430-3. The set of the common electrodes 430-1 includes at least one common electrode included in the set of the common electrodes 430-2 and at least one common electrode not included in the set of the common electrodes 430-2. The remaining sets of common electrodes 430 are similarly composed.

As the term is used in the application, a "display frame" is generated when substantially all of the common electrodes are driven for display updating. For example, a display device updating at 60 Hz may generate 60 display frames every second. In one embodiment, display update period 410-1 may include a first display frame, and display update period 410-2 may include a second display frame. In one embodiment, display update period 410-1 may include a first half of a first display frame and display update period 410-2 may include a second half of the first display frame. Similarly, display update period 410-3 may include a first half of a second display frame and display update period 410-4 may include a second half of the second display frame. In another embodiment, display update periods 410-1, 410-2, and 410-3 each may include a third of a single display frame. In yet another embodiment, display update periods 410-1, 410-2, 410-3, and 410-4 each may include a quarter of a single display frame. Any other division of display frames, including divisions in which display update period(s) span more than one display frame, also are within the scope of the invention. In one embodiment, display update period 410-1 may be a first portion of a first display frame and a portion of display update period 410-2 may be a second portion of the first display frame. In such an example, the first and second display update periods, 410-1 and 410-2, may comprise any combination of interference sensing periods and input sensing periods. Further, the common electrodes may be driven for capacitive sensing and operated for interference sensing such that at least one capacitive frame is acquired during each display update period, a portion of a capacitive frame is acquired during each display update period, or a first capacitive frame and a portion of a second capacitive frame may be acquired during the display update periods. In many of the above embodiments, the common electrodes may be driven during the display update periods such that a capacitive frame rate that is less than, greater than, or equal to the display frame rate is provided. Further, the capacitive frame rate may be any integer or non-integer multiple of the display frame rate. In many embodiments, observing time-space continuity of input sensing is important for accurately detecting user input. For instance, as described above, by taking input sensing data from consecutive display update periods to form a single sensing frame, touch sensing is substantially contiguous such that the likelihood that a sensing scan will fail to detect the positional information of an input object is reduced.

Figure 4A:
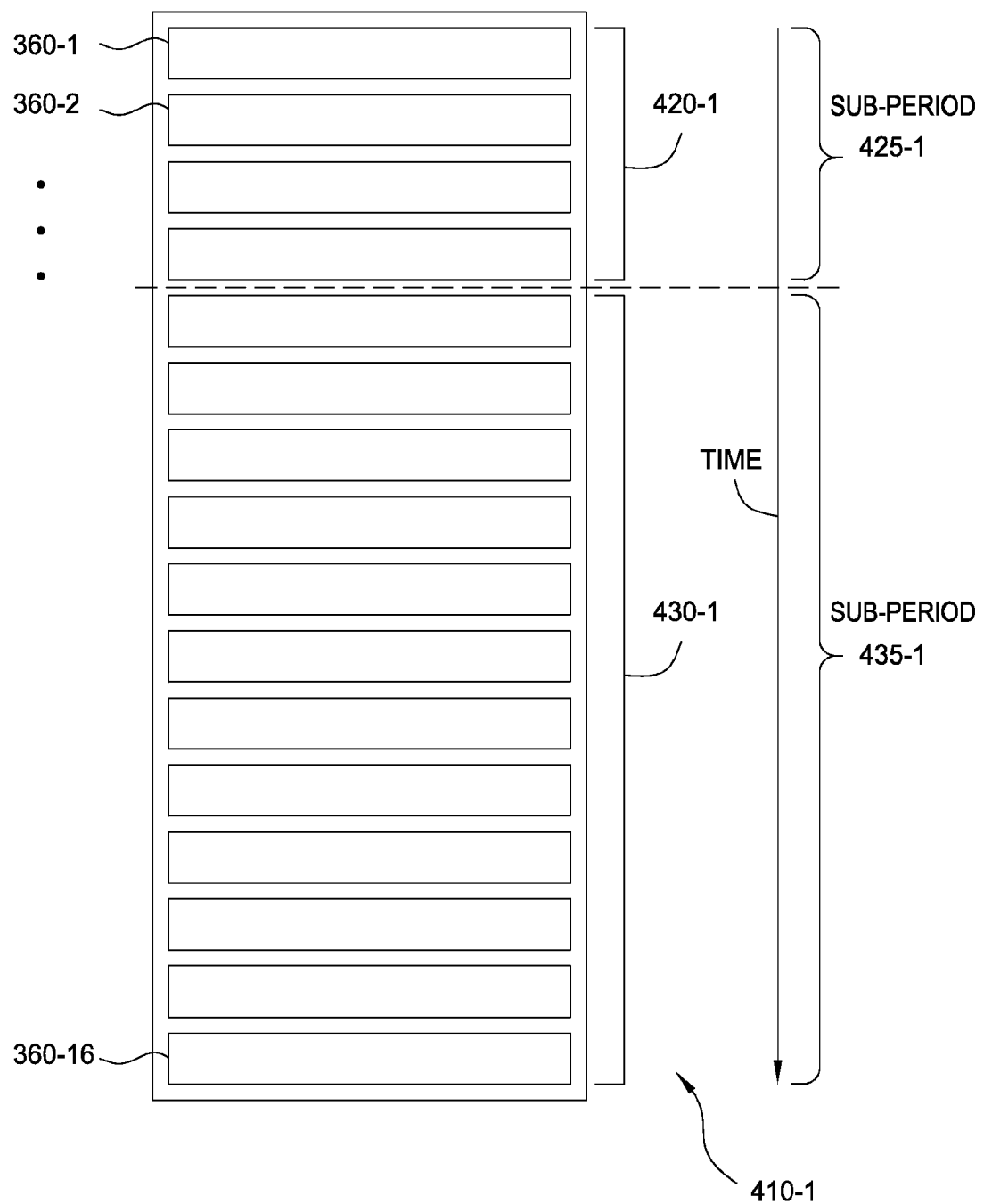
FIGS. 4A-4D illustrate schematic plan views of an embodiment of the input device of FIG. 1 during several display update periods according to one embodiment of the invention.

FIG. 4A illustrates the input devices 100 comprising a display device and integrated sensing device during a display update period 410-1. As shown in FIG. 4A, display update period 410-1 includes interference sensing sub-period 425-1 and input sensing sub-period 435-1. Interference sensing sub-period 425-1 corresponds to the non-display update time(s) of the set of common electrodes 420-1 during which all or at least a portion of the common electrodes are operated for interference sensing. That is, during interference sensing sub-period 425-1, all or at least a portion of the common electrodes are not driven for capacitive sensing or display updating. Instead, one or more non-display update times of sub-period 425-1 are used to operate some or all of the plurality of common electrodes for interference sensing. Input sensing sub-period 435-1 corresponds to the non-display update times of the set of common electrodes 430-1, during which at least one common electrode is driven for capacitive sensing. In one embodiment, at least common electrode is operated for interference sensing during interference sensing sub-period 425-1 and driven for capacitive sensing during input sensing sub-period 435-1. In many embodiments the update of common electrodes in a full display frame update proceed spatially sequentially from one end of the display (e.g. top) to the other (e.g. bottom), but a full display update using the common electrodes need not be physically sequential (i.e. it could be in any order that updates substantially all of the display) and may still be grouped into sets which are updated during sub-periods of the display update frame. Also in many embodiments, the set of common electrodes updated during a display sub-period need not correspond spatially to the electrodes operated for interference sensing (e.g. this could be all the common electrodes and not a subset), nor is it necessary for the display updating set of electrodes to correspond to the electrodes operated for input sensing or (e.g. only electrodes outside of the updating set, a subset of electrodes within the display updating set, or all of the common electrodes in the display might be operated during a sub-period).

For clarity, although sub-periods 425 and 435 refer to periods of time, each sub-period also is associated with the time periods during which common electrodes are operated for interference sensing or driven for capacitive sensing. For example, during sub-period 425-1 all or at least a portion of the common electrodes are operated for interference sensing during non-display update times corresponding to the set of common electrodes 420-1 which are highlighted in FIG. 4A. Further, input sensing sub-period 435-1 corresponds to non-display update periods of the set of common electrodes 430-1, during which a set of common electrodes are driven which are scanned for input sensing during sub-period 435-1. In one embodiment, the set of common electrodes that are driven which are scanned for input sensing during sub-period 435-1 may comprise a portion of or all of the common electrodes. In another embodiment, the set of common electrodes that are driven which are scanned for input sensing during sub-period 435-1 may comprise scanning at least two common electrodes of common electrodes multiple times for input sensing.

Interference sensing sub-period 425-1 corresponds to a first portion of a display frame and input sensing sub-period 435-1 corresponds to a second portion of the display frame. The first portion of the display frame may correspond to the combined non-display update times for each common electrode in a first set of common electrodes (e.g., 420-1). The second portion of the display frame may correspond to the non-display update time for each common electrode in a second set of common electrodes (e.g. 430-1). The non-display update time may occur in a substantially non-contiguous manner, corresponding to horizontal blanking periods, or in substantially contiguous manner, corresponding to vertical blanking period(s) or long-horizontal blanking period(s) (in-frame blanking period(s)).

In various embodiments, display update period 410-1 corresponds to a first display frame and input sensing sub-period 435-1 corresponds to a single capacitive frame, a portion of a capacitive frame, or one or more capacitive frames. For example, in one embodiment, during input sensing sub-period 435-1 a first capacitive frame may be acquired by driving each of common electrodes for capacitive sensing. In another embodiment, during input sensing sub-period 435-1, a portion of a first capacitive frame may be acquired by driving a portion of common electrodes for capacitive sensing. In such an embodiment, a capacitive frame may span multiple display frames. In yet another embodiment, during input sensing sub-period 435-1, multiple capacitive frames may be acquired by driving each of common electrodes multiple times for capacitive sensing in a single full display frame update.

In various other embodiments, display update period 410-1 may correspond to a portion of a display frame (i.e., a half, third, fourth or some other portion) and input sensing sub-period 435-1 corresponds to a portion of a capacitive frame, a single capacitive frame, or one or more capacitive frames. For example, in one embodiment, during input sensing sub-period 435-1 a first capacitive frame may be acquired by driving each of common electrodes for capacitive sensing. In another embodiment, during input sensing sub-period 435-1, a portion of a first capacitive frame may be acquired by driving a portion of common electrodes for capacitive sensing. In such an embodiment, a capacitive frame may span multiple display frames. In yet another embodiment, during input sensing sub-period 435-1, multiple capacitive frames may be acquired by driving each of common electrodes multiple times for capacitive sensing, Although the common electrodes may be driven in any sequence, for ease of explanation, FIGS. 4A-4D are described with the common electrodes driven in a top-to-bottom, sequential manner. Accordingly, in this example, the common electrodes are operated for interference sensing during interference sensing sub-period 425-1 before a set of common electrodes are driven for capacitive sensing during input sensing sub-period 435-1. However, in other embodiments, the interference sensing sub-period may occur after the input sensing sub-period or between two input sensing sub-periods. Further, input sensing sub-period 435-2 occurs before interference sensing sub-period 425-2, etc. Thus, in FIG. 4B, in one embodiment, a first set of common electrodes may be driven for capacitive sensing during input sensing sub-period 435-2, all or at least a portion of the common electrodes may be operated for interference sensing during interference sensing sub-period 425-2, and a second set of common electrodes may be driven for capacitive sensing during input sensing sub-period 435-3. Consequently, the resulting sensing image acquired during display update period 410-2 may not include sensing data corresponding to any of the common electrodes when the common electrodes are operated for interference sensing during interference sensing sub-period 425-2.

Figure 4B:
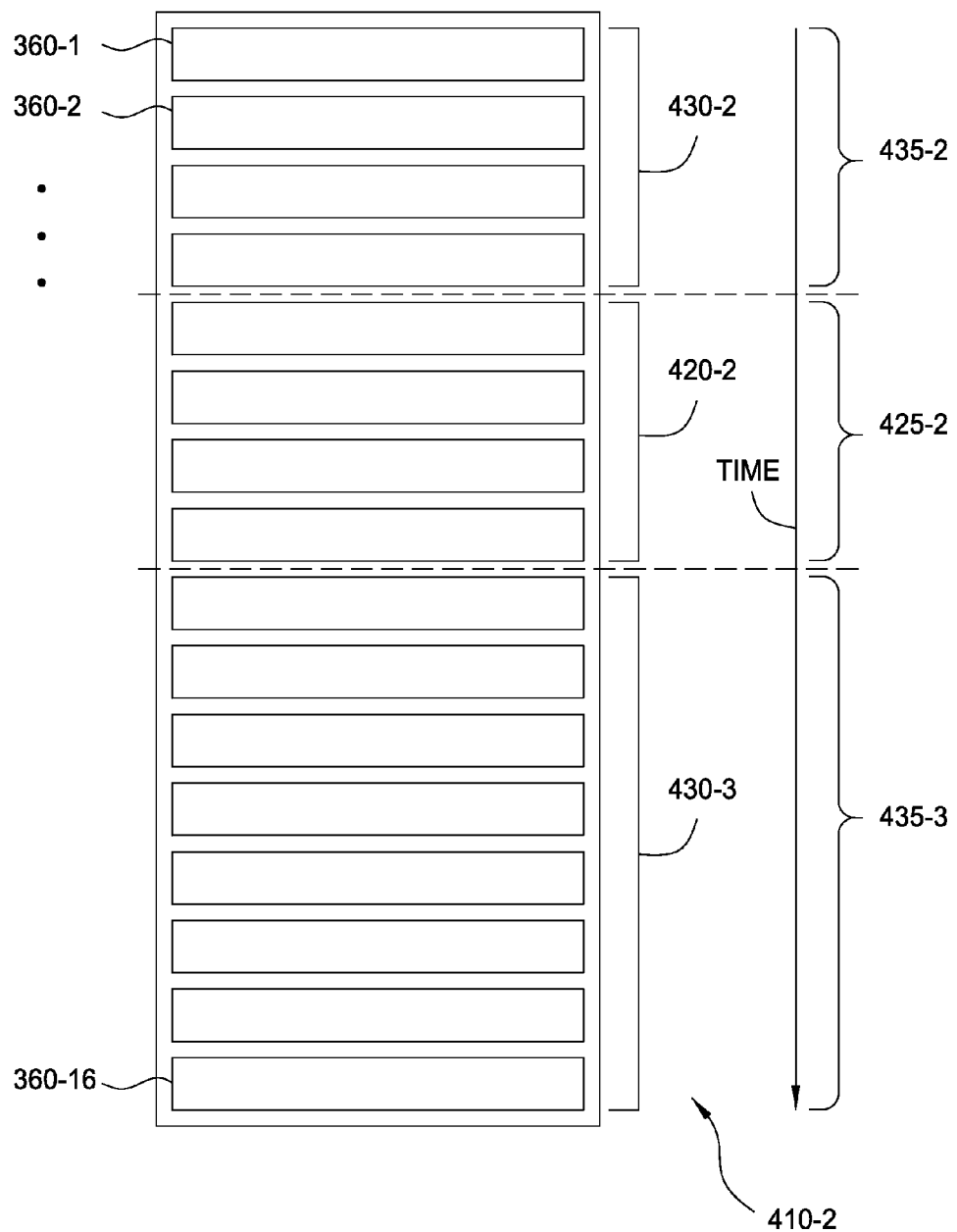

FIG. 4B illustrates an embodiment of input device 100 comprising a display device and integrated sensing device during a display update period 410-2. Display update period 410-2 includes input sensing sub-period 435-2, interference sensing sub-period 425-2, and input sensing sub-period 435-3. Input sensing sub-period 435-2 corresponds to a period of time in which one or more common electrodes is driven for capacitive sensing during the non-display update times corresponding to the set of common electrodes 430-2. Interference sub-period 425-2 corresponds to a period of time in which all or at least a portion of the common electrodes are operated for interference sensing during the non-display times corresponding to the set of common electrodes 420-2. Input sensing sub-period 435-3 corresponds to a period of time in which a set of common electrodes is driven for capacitive sensing during the non-display update times corresponding to the set of common electrodes 430-3.

In one embodiment, a first capacitive frame may be acquired during a first input sensing sub-period and a second capacitive frame may be acquired during a second input sensing period. For example, a first capacitive frame may be acquired during input sensing sub-period 435-1 and a second capacitive frame may be acquired during input sensing period 435-2. In another example, a first capacitive frame may be acquired during input sensing sub-period 435-2 and a second capacitive frame may be acquired during input sensing period 435-3. In another embodiment, a first portion of a first capacitive frame may be acquired during a first input sensing sub-period and a second portion of the first capacitive frame may be acquired during a second input sensing period. For example, a first portion of a first capacitive frame may be acquired during input sensing sub-period 435-1 and a second portion of the second capacitive frame may be acquired during input sensing period 435-2. In another example, a first portion of a first capacitive frame may be acquired during input sensing sub-period 435-2 and a second portion of the second capacitive frame may be acquired during input sensing period 435-3. In a further embodiment, a first capacitive frame and a portion of a second capacitive frame may be acquired during a first input sensing sub-period and a second portion of the first capacitive frame may be acquired during a second input sensing period. For example, a first capacitive frame and a portion of a second capacitive frame may be acquired during input sensing sub-period 435-1 and a second portion of the second capacitive frame may be acquired during input sensing period 435-2. In another example, a first capacitive frame and a portion of a second capacitive frame may be acquired during input sensing sub-period 435-2 and a second portion of the second capacitive frame may be acquired during input sensing period 435-3. Similar methods may be applied to any of the other display update periods described herein, such that the capacitive frame rate may be any rational fraction or multiple of the display frame rate.

Figure 4C:
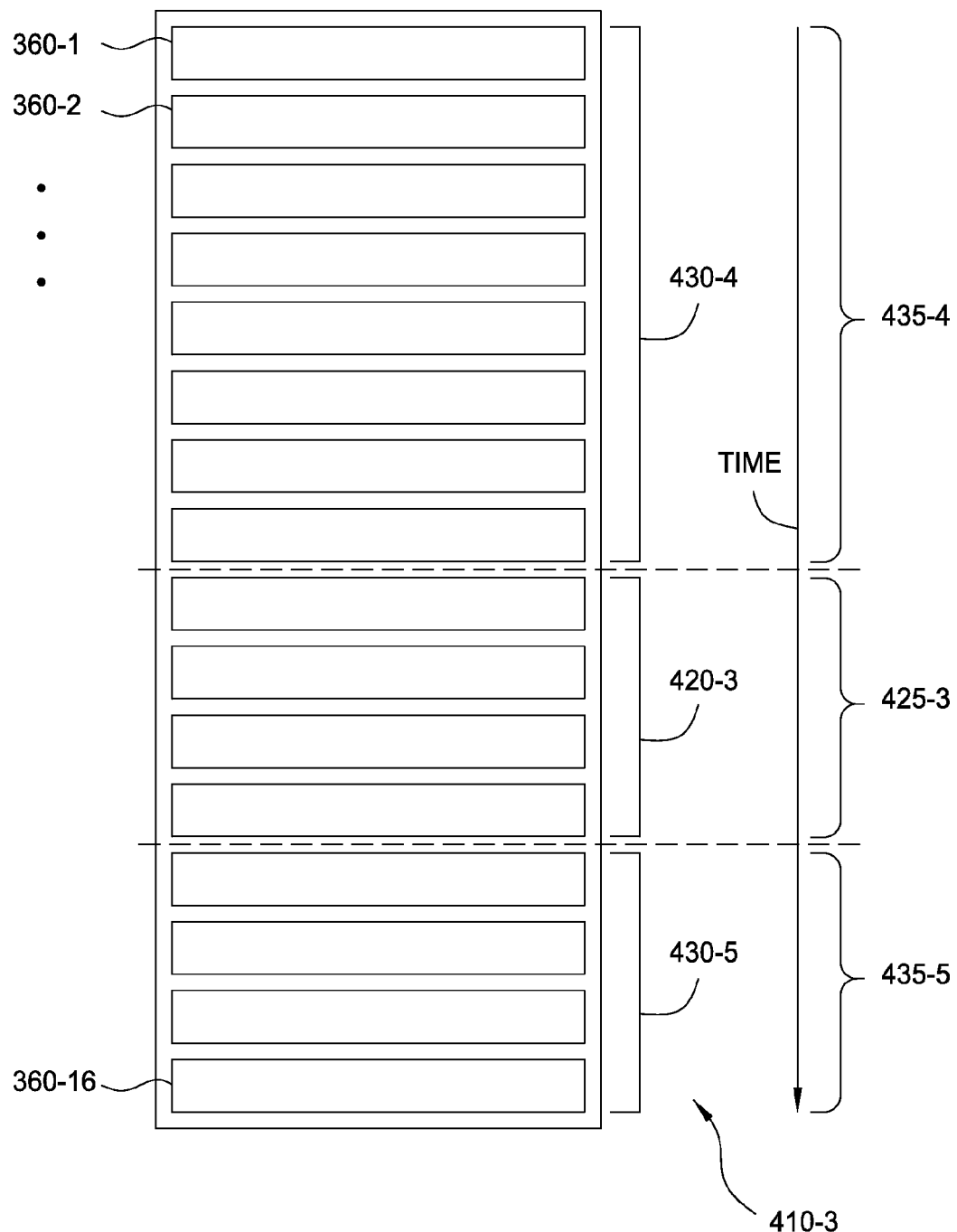
Figure 4D:
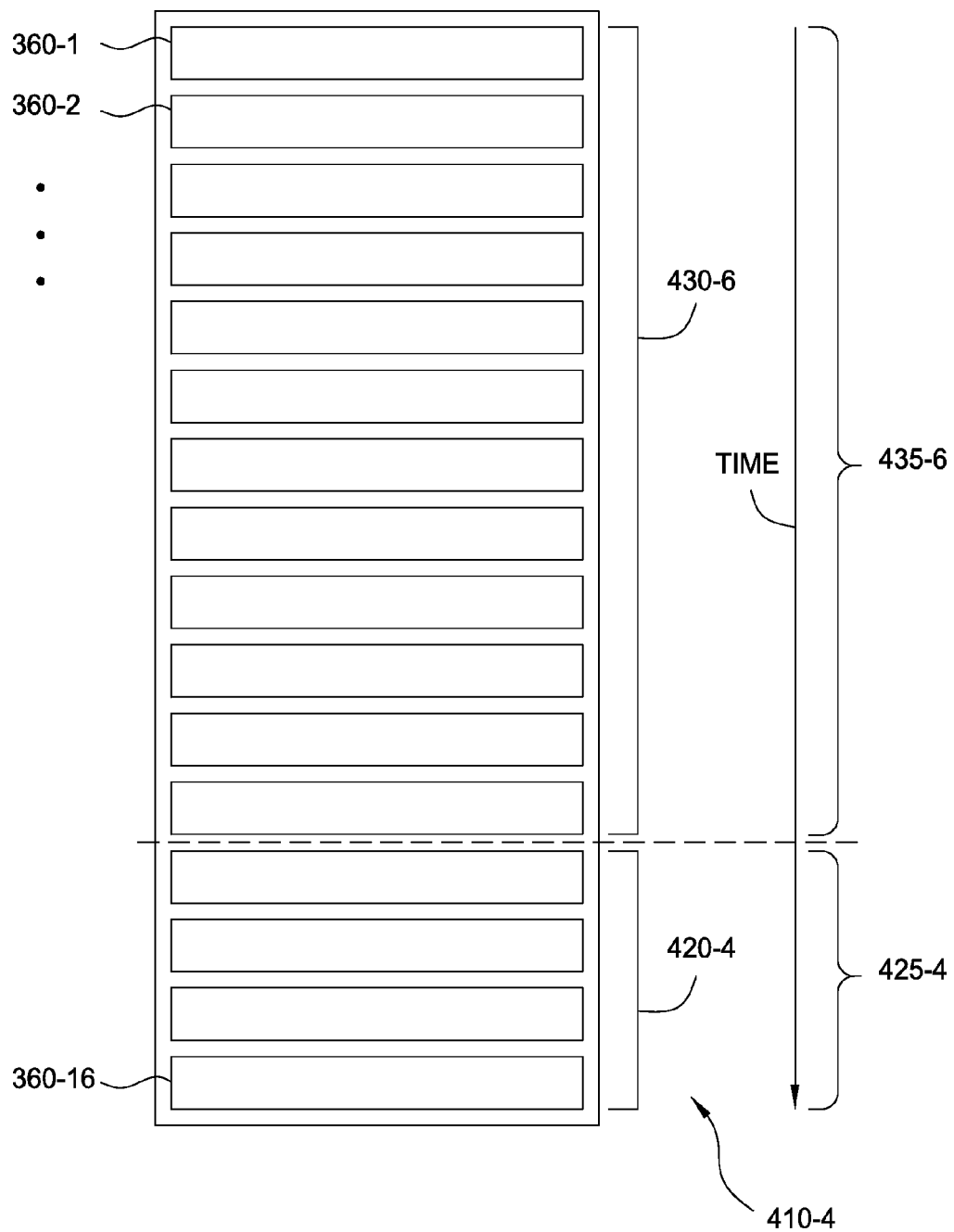

FIGS. 4C and 4D illustrate an embodiment of input device 100 comprising a display device and integrated sensing device during display update periods 410-3 and 410-4, respectively. Display update period 410-3 includes input sensing sub-period 435-4, interference sensing sub-period 425-3, and input sensing sub-period 435-5. Display update period 410-4 includes input sensing sub-period 435-6 and interference sensing sub-period 425-4. Input sensing sub-periods 435-4, 435-5, and 435-6 correspond to periods of time in which sets of common electrodes are driven for capacitive sensing, for example during non-display update times of respective sets of common electrodes 430-4, 430-5 and 430-6. Interference sub-periods 425-3 and 425-4 correspond to periods of time in which all or at least a portion of the common electrodes are operated for interference sensing during the non-display update times of sets of common electrodes 420-3 and 420-4, respectively.

In various embodiments, while only a portion of a capacitive frame (e.g., a capacitive frame that does not sample all of the common electrodes) may be acquired during a display update period 410, all of the common electrodes may be driven for capacitive sensing during any two display update periods 410 or portions of two display update periods 410 such that an entire sensing frame is acquired. For example, during display update periods 410-1 and 410-2, a first set of common electrodes is driven for capacitive sensing during input sensing sub-period 435-1, and a second set of common electrodes are driven for capacitive sensing during an input sensing sub-period 435-2. In one embodiment, the first set of common electrodes and the second set of common electrodes are portions of the same capacitive frame. Each set could be one-half, one-third, one-fourth or some other portion of a capacitive frame. In other embodiments, driving the first set of common electrodes for capacitive sensing comprises driving at least one of the common electrodes for capacitive sensing more than one time, such that during input sensing sub-period 435-1 more than one capacitive frame may be acquired. Further, in such embodiments, a first frame and a first portion of a second frame may be acquired during input sensing sub-period 435-1 while a second portion of the second frame may be acquired during input sensing sub-period 435-2. It is contemplated that larger or smaller sets of common electrodes may be operated for interference sensing during each display update period 410. Consequently, embodiments in which interference measurements acquired during more (or less) than four display update periods 410 are combined to form a single, complete interference frame also are within the scope of the invention. In various embodiments, combined interference frames may be independent (e.g. the following interference frame based on data from a different non-overlapping set of update periods) or overlapping and only partially independent (e.g. the following frame based on only one new update period, but also a portion of update periods the previous interference frame is based on).

In addition to performing input sensing and/or interference sensing during the non-display update times of interference and input sensing sub-periods 425 and 435, one or more of the common electrodes may be driven for display updating during the display-update times of these sub-periods. However, since display updating and input sensing may be performed at different rates and/or out of phase with each another, the common electrodes driven for display updating during display-update times of interference sensing sub-periods 425 may be the same as, overlap with, or be entirely different than the common electrodes being operated for interference sensing during interference sensing sub-periods 425. Similarly, the common electrodes driven for display updating during display-update times of input sensing sub-periods 435 may be the same as, overlap with, or be entirely different than the set(s) of common driven for capacitive sensing during input sensing sub-period(s) 435. In still other embodiments, interference and input sensing sub-periods 425 and/or 435 may correspond entirely or substantially entirely to non-display update time periods.

By operating all or at least a portion of the common electrodes for interference sensing during non-display update times corresponding to sets of common electrodes 420, complete sensing frames may be acquired at rates which are non-integer multiples of the display refresh rate. For example, by operating all or at least a portion of the common electrodes for interference sensing during non-display update times corresponding to sets of common electrodes 420 as described above, one complete sensing frame may be acquired for each two-thirds display frames. Consequently, the effective rate at which sensing frames are acquired is three-halves times the display refresh rate. By varying the length of each sub-periods and/or the number of sub-periods in a display update period 410, input sensing may be performed at other non-integer multiples of the display refresh rate (e.g., such as four-thirds, five-fourths, etc.). In one embodiment, the rate at which input sensing is performed may be varied between a variety of integer and/or non-integer multiples of the display refresh rate. For example, the rate at which input sensing is performed may be changed if interference is present when input sensing is performed at a rate which is a particular multiple of the display refresh rate. The input sensing capacitive frame rate may be varied in response to interference in order to improve performance (e.g. increasing the rate when interference is low to reduce latency, and reducing the rate when interference is high to increase interference tolerance).

During interference sensing sub-periods, interference sensing may be performed by operating the common electrodes in a substantially non-modulating manner. In one example, operating the common electrodes in a substantially non-modulating manner may include driving the electrodes with a substantially constant voltage (e.g., a V-com, a system reference voltage or another voltage). In another example, the substantially constant voltage may be a voltage of a system ground. In yet another example, operating the common electrodes in a substantially non-modulating manner may include electrically floating the electrodes.

The measurement of interference may be time-based and may depend on factors such as which area(s) of the display image are being updated. However, because the processing system 110 may update the display at a substantially constant rate, interference or "noise" may be phase-locked to the updating of the display, that is, the locations of interference may be relatively fixed in the integrated touch screen device. As a result, different baselines may be used for different locations (e.g., different capacitive pixels) and different sub-periods to account for interference in the integrated touch screen device. Additionally, the degree to which interference is present in different areas of the screen may have some dependence on the screen image, since different screen images require pixels to be driven at different voltages.

Interference measurements acquired during interference sensing sub-periods may be used in a variety of ways to increase the accuracy with which input sensing is performed. In one embodiment, interference data may be used to determine baseline interference values, such as images representing the baseline interference at one or more capacitive pixels and/or areas of a capacitive frame. Such baseline images may be combined with baseline capacitance images to enable more accurate detection of changes in capacitance caused by an input device, allowing the presence (or lack thereof) and location of an input device to be more accurately determined. In another embodiment, interference measurements may be used to determine the frequency at which to drive the common electrodes for input sensing. The common electrodes may be driven at a frequency of about 50 kHz to about 1 MHz; however, frequencies less than 50 kHz and above 1 MHz may also be used. If, for example, the common electrodes experience an undesirable level of interference when driven with a transmitter signal having a frequency of 215 kHz, the driving frequency may be shifted to a transmitter signal having a different frequency, such as 220 kHz, 225 kHz, etc., which has a lower incidence or magnitude of interference, thereby providing a clean signal for more accurate input detection.

In other embodiments, interference measurements may be used to determine that a baseline image should not be acquired, or that a baseline image which has been acquired should not be used, because a noise measurement is over a threshold level. Similarly, interference measurements may be used to determine that, because a noise measurement is over a threshold level, the corresponding input data should be disregarded or additional input sensing data should be acquired due to the effects of interference (e.g., reporting of positional information may be delayed to increase confidence of the positional information). Interference measurements also may be used to filter input sensing data or to determine how to filter input sensing data. For instance, input sensing data may be filtered by comparing the data with heuristic models of user input or interference to determine whether input sensing data corresponds to user input or is a result of noise such as EMI. In one embodiment, the length of or the number of the non-display update periods may be adjusted based on the interference measurements.

An interference frame may be used in the manner described above to increase the accuracy with which the previous sensing frame is acquired. For example, an interference frame acquired during sub-period 425-2 may be used with the complete sensing frame acquired during sub-periods 435-1 and 435-2. Such a configuration enables interference measurements to be disregarded for the purposes of input sensing unless the touch screen detects that an input object may be present. Alternatively, an interference frame may be used with the previous sensing frame within the scope of the invention. For example, an interference frame acquired during sub-period 425-1 may be used with the complete sensing frame acquired during sub-periods 435-1 and 435-2. This configuration enables a sensing frame to be processed, and the positional information of an input object determined, more quickly than if an interference frame must be acquired before processing of the sensing frame may begin.

As discussed above, each interference sensing sub-period 425 and/or sensing sub-period 435 may occur during a non-display update time. In some embodiments, one or more interference sensing sub-period(s) 425 and/or one or more sensing sub-period(s) 435 may occur during the same non-display update time. In such embodiments, the common electrodes which correspond to sub-period 435-2 may be sequentially driven for capacitive sensing and, subsequently, the common electrodes which correspond to sub-period 425-2 may be operated for interference sensing and some or all of the common electrodes operated for interference sensing.

Sensing Method

Figure 5:
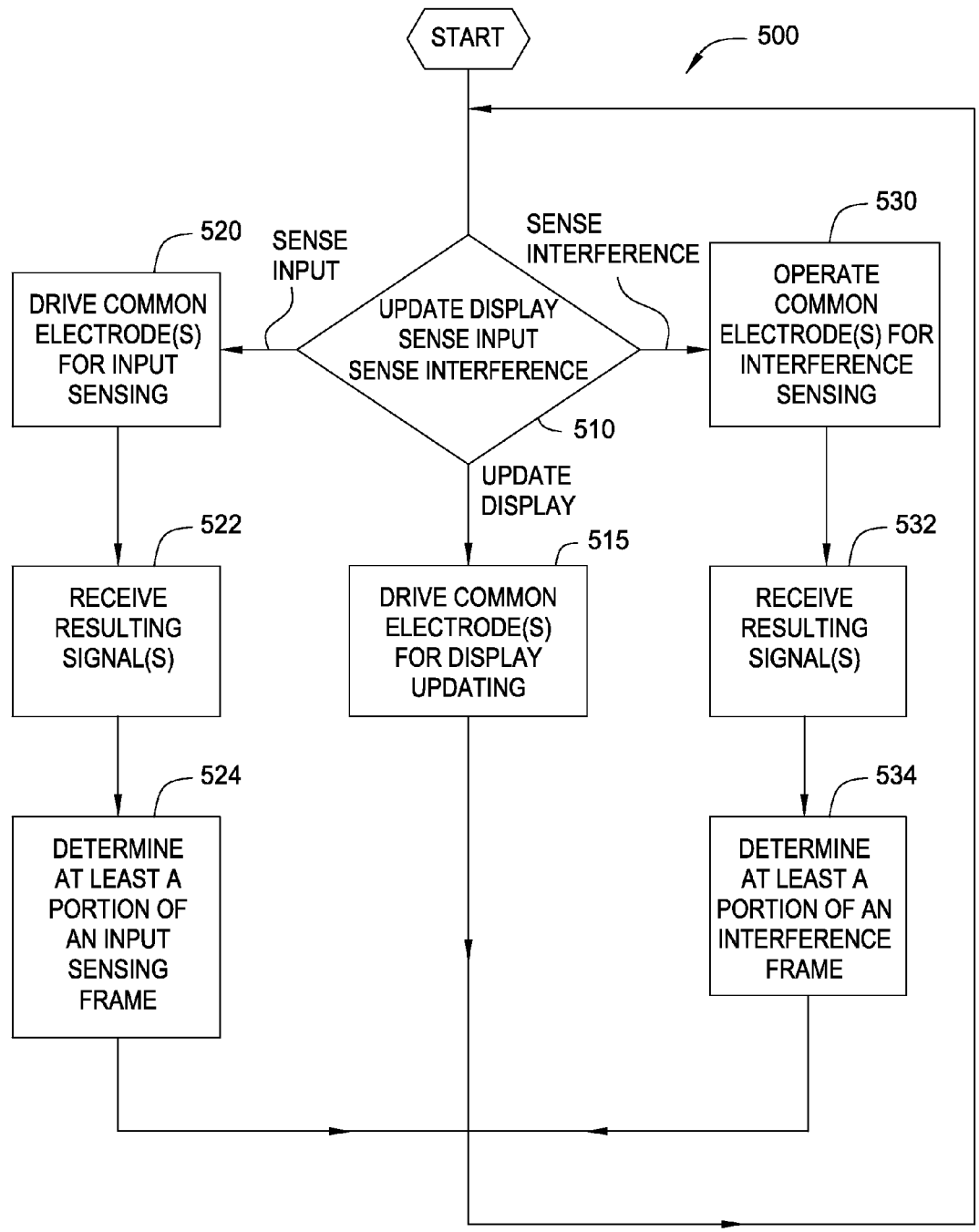
FIG. 5 is a flow diagram for a method of capacitive sensing in a display device in accordance with embodiments of the invention.

FIG. 5 illustrates a method 500 of capacitive sensing in a display device in accordance with embodiments of the invention. The display device may include a plurality of common electrodes configured for capacitive sensing and display updating. The plurality of common electrodes may include a first set of common electrodes and a second set of common electrodes. The first set of the common electrodes may include at least one common electrode included in the second set of the common electrodes and at least one common electrode not included in the second set of the common electrodes.

The method 500 includes driving the plurality of common electrodes for display updating during a first display frame and during a second display frame at step 515. At step 520, the first set of common electrodes is driven for capacitive sensing during a first portion of the first display frame. At step 522, first resulting signals are received during the first portion of the first display frame. At step 524, at least portion of a first capacitive frame is determined based on the first resulting signals. Steps 522 and 524 may be repeated with different sets of common electrodes being operated for interference sensing. At step 530, the plurality of common electrodes is operated in a substantially non-modulating manner for interference sensing during a second portion of the first display frame. At step 532, second resulting signals are received during the second portion of the first display frame. At step 534, an interference measurement corresponding to the first capacitive frame is determined based on the second resulting signals.

Thus, the embodiments and examples set forth herein were presented in order to best explain the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the present technology to the precise form disclosed.

What is claimed is:

1. A processing system for a display device with an integrated capacitive sensing device comprising:
    a driver module configured to be communicatively coupled to a plurality of common electrodes configured for capacitive sensing and display updating, the plurality of common electrodes comprising a first set of common electrodes and a second set of common electrodes, the first set of the common electrodes including at least one common electrode included in the second set of the common electrodes and at least one common electrode not included in the second set of the common electrodes, the driver module configured for:
        driving the plurality of common electrodes for display updating during a first display frame;
        driving the first set of common electrodes for capacitive sensing during a first portion of the first display frame, wherein at least one common electrode included in the second set of the common electrodes is not driven for capacitive sensing during the first display frame; and
        operating the plurality of common electrodes in a substantially non-modulating manner for interference sensing during a second portion of the first display frame;
    a receiver module configured to be communicatively coupled to a plurality of receiver electrodes, the receiver module configured for:
        receiving first resulting signals during the first portion of the first display frame; and
        receiving second resulting signals during the second portion of the first display frame; and
    a determination module configured for determining at least portion of a first capacitive frame based on the first resulting signals and an interference measurement corresponding to the first capacitive frame based on the second resulting signals.

2. The processing system of claim 1, further comprising the driver module configured for:
    driving the plurality of common electrodes for display updating during a second display frame
    driving the second set of common electrodes for capacitive sensing during a first portion of the second display frame; and
    operating the plurality of common electrodes in a substantially non-modulating manner for interference sensing during a second portion of the second display frame;
    the receiver module configured for:
        receiving third resulting signals during the first portion of the second display frame; and
        receiving fourth resulting signals during the second portion of the second display frame with the plurality of receiver electrodes; and
    the determination module configured for determining at least portion of a second capacitive frame based on the third resulting signals and an interference measurement corresponding to the second capacitive frame based on the fourth resulting signals.

3. The processing system of claim 1, further comprising the driver module configured for:
    driving the plurality of common electrodes for display updating during a second display frame
    driving a third set of common electrodes for capacitive sensing during a first portion of the second display frame, the third set of the common electrodes including at least one common electrode not included in the first set of the common electrodes; and
    the receiver module configured for:
        receiving third resulting signals during the first portion of the second display frame with the plurality of receiver electrodes; and
    the determination module is further configured for determining at least second portion of a first capacitive frame based on the third resulting signals.

4. The processing system of claim 1, further comprising the driver module configured for:
    driving a third set of common electrodes for capacitive sensing during a third portion of the first display frame, the third set of the common electrodes including at least one common electrode not included in the first set of the common electrodes; and
    the receiver module further configured for:
        receiving third resulting signals during the third portion of the first display frame with the plurality of receiver electrodes; and
    the determination module is further configured for determining at least a second portion of a first capacitive frame based on the third resulting signals.

5. The processing system of claim 1, wherein the driver module is further configured to drive the first and second set of common electrodes for capacitive sensing and operate the plurality of common electrodes in a non-modulating manner during the first display frame during a non-display update period of the display device.

6. The processing system of claim 1, wherein operating the plurality of common electrodes in a non-modulating manner for interference sensing during a second portion of the first display frame comprises at least one of driving the plurality of common electrodes with a substantially constant voltage and electrically floating the plurality of common electrodes.

7. The processing system of claim 6, wherein the substantially constant voltage comprises a system reference voltage.

8. The processing system of claim 1, wherein driving the first set of common electrodes for capacitive sensing during a first portion of the first display frame comprises driving the first set of common electrodes with a first transmitter signal having a first frequency and wherein the processing system is configured to shift from driving the first set of common electrodes with the first transmitter signal having the first frequency to driving the first set of common electrodes with a second transmitter signal having a second frequency based on the interference measurement, wherein the first frequency is different than the second frequency.

9. The processing system of claim 1, wherein the processing system is configured to determine a baseline interference value based on the second resulting signals.

10. A processing system with an integrated capacitive sensing device comprising:
a plurality of common electrodes configured for capacitive sensing and display updating, the plurality of common electrodes comprising a first set of common electrodes and a second set of common electrodes, the first set of the common electrodes including at least one common electrode included in the second set of the common electrodes and at least one common electrode not included in the second set of the common electrodes;
a driver module configured to be communicatively coupled to the plurality of common electrodes and configured to:
drive the plurality of common electrodes for display updating during a first display frame and during a second display frame;
drive the first set of common electrodes for capacitive sensing during a first portion of the first display frame, wherein at least one common electrode included in the second set of the common electrodes is not driven for capacitive sensing during the first display frame;
operate the plurality of common electrodes in a substantially non-modulating manner for interference sensing during a second portion of the first display frame;
drive the second set of common electrodes for capacitive sensing during a first portion of the second display frame; and
operate the plurality of common electrodes in a substantially non-modulating manner for interference sensing during a second portion of the second display frame;
a plurality of receiver electrodes;
a receiver module configured to be communicatively coupled to a plurality of receiver electrodes and configured to:
receive first resulting signals during the first portion of the first display frame, second resulting signals during the second portion of the first display frame, third resulting signals during the first portion of the second display frame, and fourth resulting signals during the second portion of the second display frame with the plurality of receiver electrodes; and
a determination module configured to determine at least portion of a first capacitive frame based on the first resulting signals and an interference measurement corresponding to the first capacitive frame based on the second resulting signals.

11. The display device of claim 10, wherein the determination module is further configured to determine at least portion of a second capacitive frame based on the third resulting signals and an interference measurement corresponding to the second capacitive frame based on the fourth resulting signals.

12. The display device of claim 10, wherein the driver module is further configured to drive a third set of the common electrodes for capacitive sensing during a third portion of the first display frame, the third set of the common electrodes including at least one common electrode not included in the first set of the common electrodes, the receiver module is further configured to receive fifth resulting signals with the receiver electrodes during the third portion of the first display frame and the determination module is further configured to determine the first capacitive frame based on at least a portion of the fifth resulting signals.

13. The display device of claim 10, wherein the driver module is further configured to drive a third set of the common electrodes for capacitive sensing during a third portion of the second display frame, the third set of the common electrodes including at least one common electrode not included in the first set of the common electrodes, the receiver module is further configured to receive fifth resulting signals with the receiver electrodes during the third portion of the second display frame and the determination module is further configured to determine the first capacitive frame based on at least a portion of the fifth resulting signals.

14. The display device of claim 10, wherein operating the plurality of common electrodes in a substantially non-modulating manner for interference sensing during the second portion of the first display frame and during the second portion of the second display frame comprises one of driving the plurality of common electrodes with a substantially constant voltage and electrically floating the plurality of common electrodes.

15. The display device of claim 10, wherein driving the first set of common electrodes for capacitive sensing during a first portion of the first display frame comprises driving the first set of common electrodes with a first transmitter signal having a first frequency and wherein the processing system is configured to shift from driving the first set of common electrodes with the first transmitter signal having the first frequency to driving the first set of common electrodes with a second transmitter signal having a second frequency based on the interference measurement, wherein the first frequency is different than the second frequency.

16. A method of capacitive sensing in a display device having a plurality of common electrodes configured for capacitive sensing and display updating, the plurality of common electrodes comprising a first set of common electrodes and a second set of common electrodes, the first set of the common electrodes including at least one common electrode included in the second set of the common electrodes and at least one common electrode not included in the second set of the common electrodes, the method comprising:
driving the plurality of common electrodes for display updating during a first display frame and during a second display frame;
driving the first set of common electrodes for capacitive sensing during a first portion of the first display frame, wherein at least one common electrode included in the second set of the common electrodes is not driven for capacitive sensing during the first display frame;
operating the plurality of common electrodes in a substantially non-modulating manner for interference sensing during a second portion of the first display frame;
driving the second set of common electrodes for capacitive sensing during a first portion of the second display frame;
operating the plurality of common electrodes in a substantially non-modulating manner for interference sensing during a second portion of the second display frame;
receiving first resulting signals during the first portion of the first display frame;
receiving second resulting signals during the second portion of the first display frame;
receiving third resulting signals during the first portion of the second display frame;

receiving fourth resulting signals during the second portion of the second display frame; and determining at least portion of a first capacitive frame based on the first resulting signals and an interference measurement corresponding to the first capacitive frame based on the second resulting signals.

17. The method of claim 16, further comprising determining at least portion of a second capacitive frame based on the third resulting signals and an interference measurement corresponding to the second capacitive frame based on the fourth resulting signals.

18. The method of claim 16, further comprising:

driving a third set of the common electrodes for capacitive sensing during a third portion of the first display frame, the third set of the common electrodes including at least one common electrode not included in the first set of the common electrodes;

receiving fifth resulting signals during the third portion of the first display frame; and determining the first capacitive frame based on at least a portion of the fifth resulting signals.

19. The method of claim 16, further comprising:

driving a third set of the common electrodes for capacitive sensing during a third portion of the second display frame, the third set of the common electrodes including at least one common electrode not included in the first set of the common electrodes;

receiving fifth resulting signals during the third portion of the second display frame; and determining the first capacitive frame based on at least a portion of the fifth resulting signals.

20. The method of claim 16, wherein operating the plurality of common electrodes in a substantially non-modulating manner for interference sensing during the second portion of first display frame and during the second portion of the second display frame comprises one of driving the plurality of common electrodes with a substantially constant voltage and electrically floating the plurality of common electrodes.

21. A processing system for a display device with an integrated capacitive sensing device comprising:

a driver module configured to be coupled to a plurality of common electrodes configured for capacitive sensing and display updating, the driver module configured for:

driving the plurality of common electrodes for display updating during a first display frame;

driving a first set of common electrodes included in the plurality of common electrodes for capacitive sensing during a first portion of the first display frame, wherein a second set of common electrodes included in the plurality of common electrodes is not driven for capacitive sensing during the first display frame; and operating one or more of the plurality of common electrodes in a substantially non-modulating manner for interference sensing during a second portion of the first display frame that corresponds to a duration of time during which the second set of common electrodes are driven for capacitive sensing during a second display frame;

a receiver module configured to be communicatively coupled to the plurality of receiver electrodes, the receiver module configured for:

receiving first resulting signals during the first portion of the first display frame; and receiving second resulting signals during the second portion of the first display frame; and a determination module configured for determining at least portion of a first capacitive frame based on the first resulting signals and an interference measurement corresponding to the first capacitive frame based on the second resulting signals.

* * * * *